United States Patent
Shintani

[19]

[11] Patent Number: 6,137,480
[45] Date of Patent: Oct. 24, 2000

[54] COMPUTER SYSTEM USING A PORTABLE CARD FOR MANAGING SECURITY AND POWER-SAVING FEATURES

[75] Inventor: Peter Shintani, Tokyo, Japan

[73] Assignee: Sony Corporation, Tokyo, Japan

[21] Appl. No.: 08/995,411

[22] Filed: Dec. 19, 1997

[30] Foreign Application Priority Data

Dec. 27, 1996 [JP] Japan ................................ 8-351162

[51] Int. Cl.[7] .......................... G09G 5/00; G08C 21/00; G08B 1/08
[52] U.S. Cl. ................ 345/169; 178/18.04; 178/18.09; 340/825.31
[58] Field of Search .................. 345/162, 169, 345/172; 340/825.31; 705/18; 235/380, 382, 382.5, 492, 493; 713/200, 201, 202, 320, 324; 178/18.01, 18.03, 18.04, 18.09, 18.1

[56] References Cited

U.S. PATENT DOCUMENTS

| | | | |
|---|---|---|---|
| 5,377,269 | 12/1994 | Heptig et al. | 340/825.31 |
| 5,379,033 | 1/1995 | Fujii et al. | 340/825.31 |
| 5,382,778 | 1/1995 | Takahira et al. | 235/382 |
| 5,698,837 | 12/1997 | Furuta | 235/492 |
| 5,821,854 | 10/1998 | Dorinski et al. | 340/825.31 |
| 5,841,868 | 11/1998 | Helbig, Sr. | 340/825.31 |

*Primary Examiner*—Vijay Shankar
*Attorney, Agent, or Firm*—Jay H. Maioli

[57] ABSTRACT

To enhance service to a user and the security and others of a computer system by managing the respective operations of plural computer terminals using a non-contact card, a user is authenticated by a communicating between the non-contact card storing the personal identification information of the user and peripheral equipment arranged in the vicinity of the user such that login to a computer is automatically executed according to the result of the authentication. By making communication with the non-contact card periodically it is determined whether the user has temporarily left his/her seat, in which case a screen saver is activated and a file is automatically stored.

11 Claims, 3 Drawing Sheets

COMPUTER SYSTEM USING A PORTABLE CARD FOR MANAGING SECURITY AND POWER-SAVING FEATURES

BACKGROUND OF THE INVENTION

1. Field of the Invention

The present invention relates to a computer system for managing a computer terminal using a non-contact card and enables exact communication between the non-contact card and the computer terminal.

2. Description of the Related Art

In a conventional type computer system, as a means for preventing data or a file as a work object from being lost when a computer is disabled suddenly, a file automatic storage function included in the word processor software for example is known. The file automatic storage function periodically and automatically stores a file as a work object in a storage medium and enables return to a work state before a predetermined time has expired even if a computer is disabled.

If a user of a computer does not use the computer for a long time and the same video signal continues to be displayed on a computer display, a CRT display screen seizes. As a means for preventing the above situation, a screen saver and a power saving function are known.

The above screen saver is software for preventing a CRT display screen from locally seizing by detecting that a computer is not used for predetermined time, automatically generating a graphic image and displaying it on the display.

The above power saving function automatically changes the current state of a computer to a standby state or darkens the screen by detecting that no video signal has been supplied from the body of the computer to a computer display for a predetermined time.

However, the above file automatic storage function is executed independent of whether a user is actually sitting in front of a computer terminal or not and if a user is leaving his/her seat and another person uses a computer as the person likes, the result of the operation is stored.

The screen saver and the power saving function are devised to prevent a computer CRT display screen from seizing but, are not devised to prevent another person except a real user from operating a computer terminal and another person can readily utilize a computer terminal.

One proposed approach is enabled by setting a password that when a real user is absent, another person cannot utilize the computer terminal of the real user, however, the real user is required to input his/her password every time the real user returns to his/her seat again and it is troublesome.

SUMMARY OF THE INVENTION

The present invention is made to solve the above problems and a computer system according to the present invention is constituted by a portable card provided with a communication circuit for storing the personal identification information of a user and communication means provided to peripheral equipment constituting the computer system for communicating with the above portable card and is characterized in that a computer processes the above personal identification information received from the portable card via the communication means.

As the communication means for communicating with a non-contact card which is excellent in portability is provided to peripheral equipment arranged in the vicinity of a user of a computer terminal according to the present invention, the non-contact card suspended from a user's neck, for example, is in the range of the communicable area of the communication means if the user sits down and a secure detection area can be acquired.

DESCRIPTION OF THE PREFERRED EMBODIMENTS

Figure 1:
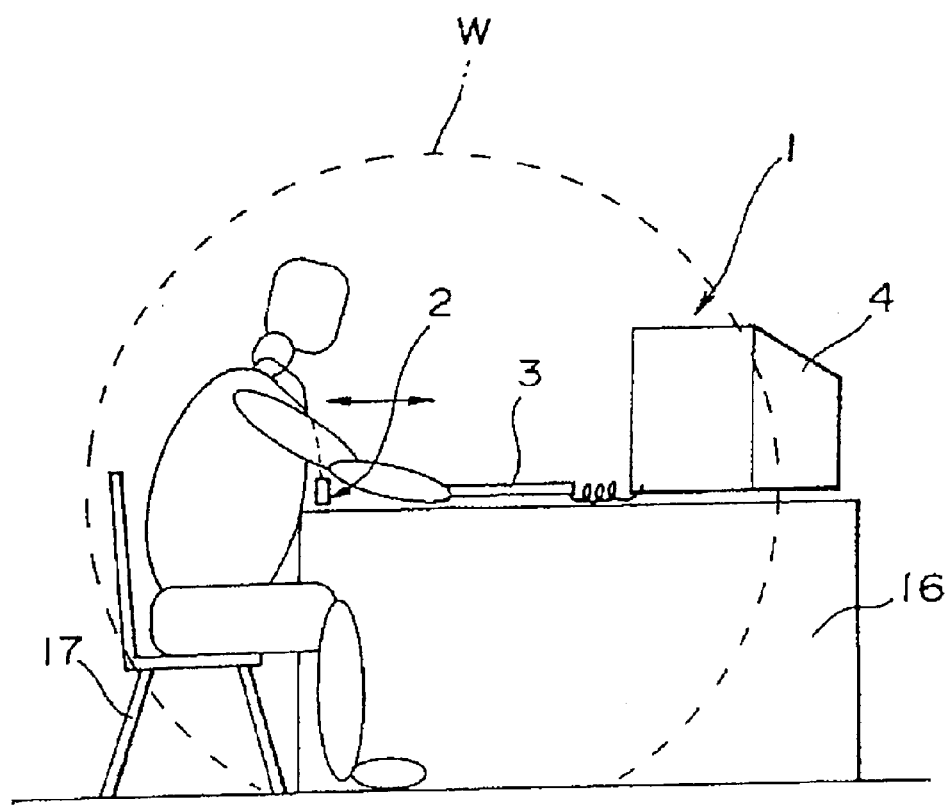
FIG. 1 is an explanatory drawing showing relationship between terminal equipment according to the present invention and a user having a keyboard.

Next, referring to the drawings, a computer system according to the present invention will be described.

The computer system according to the present invention is constituted by a computer terminal 1 and a portable non-contact card 2 which can be used with the portable non-contact card suspended from the neck and others of a user who operates the computer terminal 1 as shown in FIG. 1. The computer terminal 1 is constituted by a keyboard 3, which is the input means, and a display 4. The body of the computer and other elements are not shown.

Figure 2:
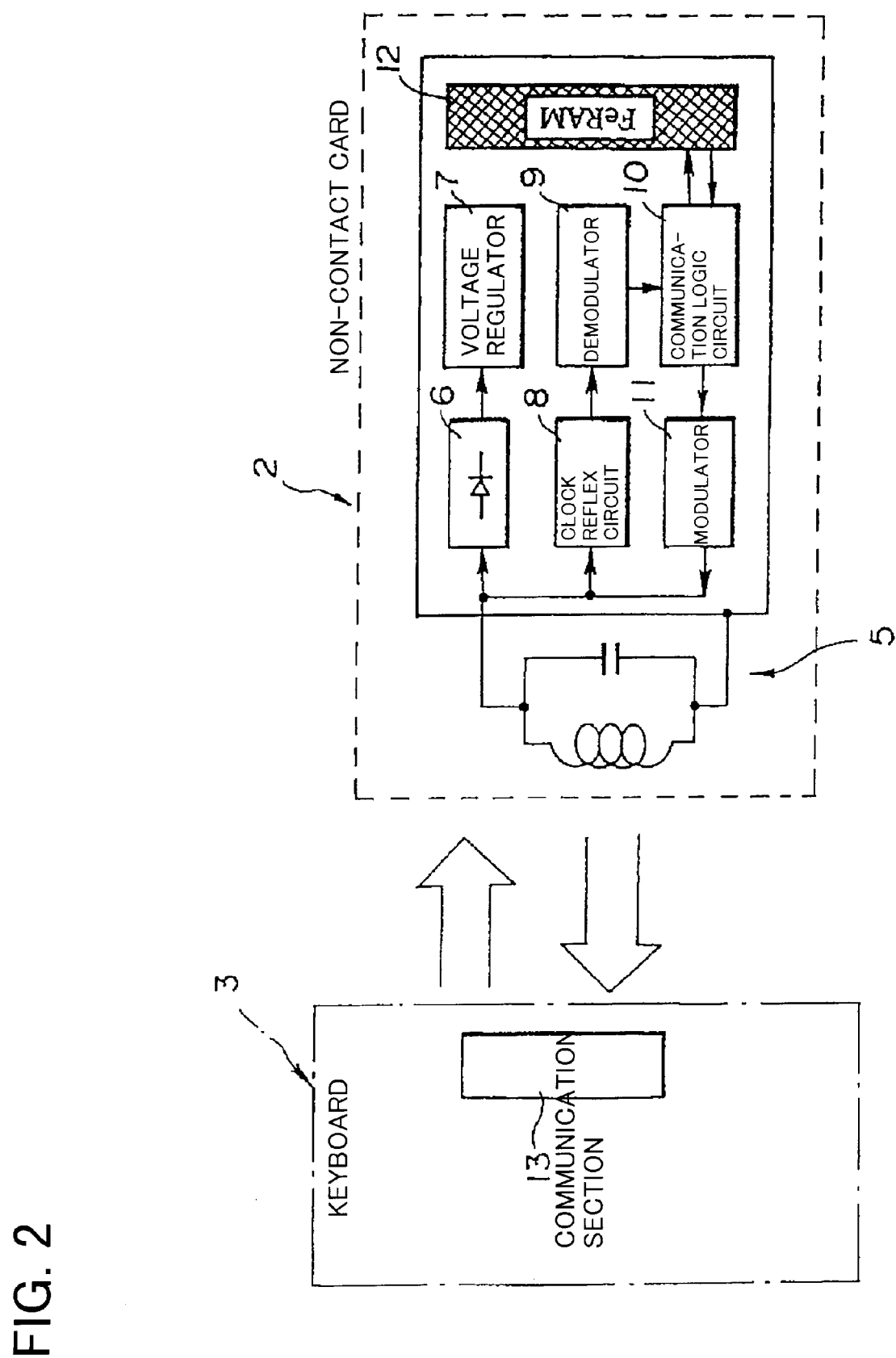
FIG. 2 is an explanatory drawing showing the structure of a non-contact card according to the present invention in block diagram.

The non-contact card 2 is constituted by a resonance circuit 6 consisting of a coil and a capacitor, a rectifier 7 connected to the resonance circuit 6, a voltage regulator 8 connected to the rectifier 7 for generating supply voltage in the non-contact card, a clock regenerating circuit 9, a demodulator 10, a microcomputer 11, a modulator 12 and nonvolatile memory FeRAM 13 as shown in FIG. 2.

Personal identification information is written to the nonvolatile memory FeRAM 13 and at least a password proper to an individual and a code for guaranteeing identity are included in the personal identification information and further information, such as accessible file name and data type in a usable computer system is also written.

Figure 3:
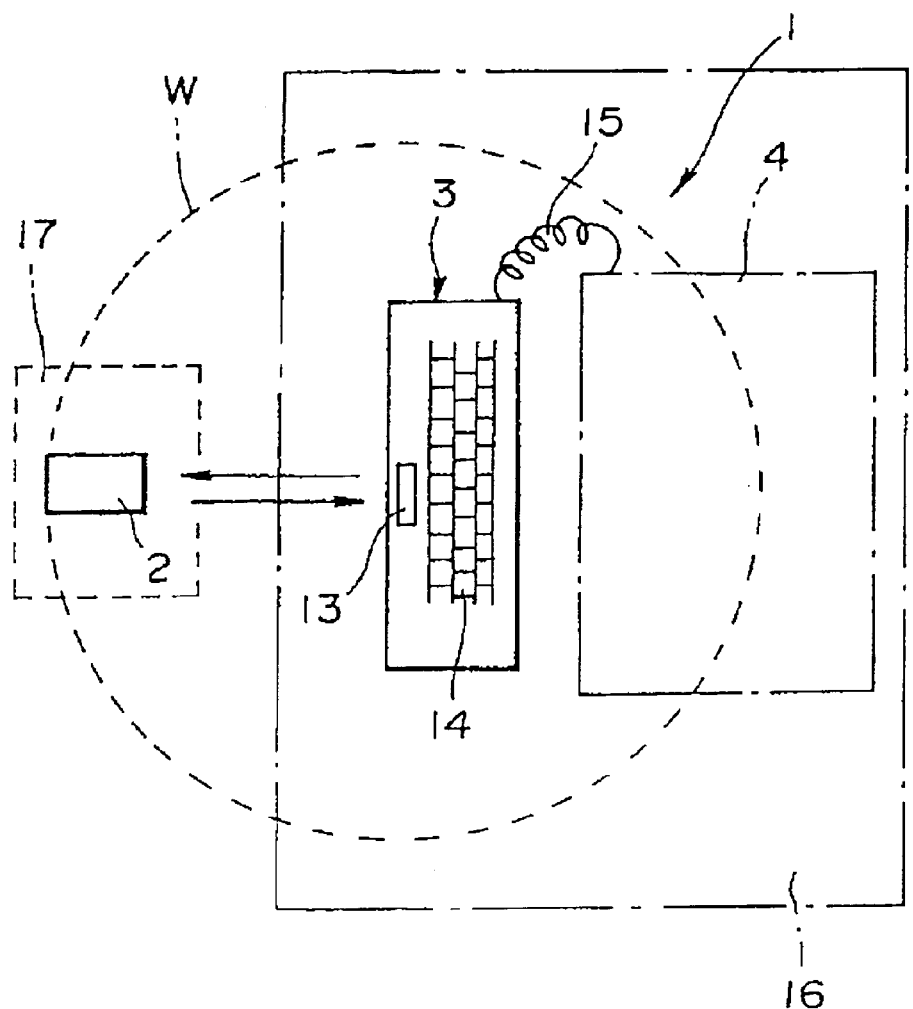
FIG. 3 is an explanatory drawing showing the non-contact card brought close to a desk and a detection area by the keyboard provided with a detecting section for detecting the non-contact card.

A communication section 14 for communicating with the non-contact card 2 is provided to the keyboard 3 in addition to operating keys 18 as shown in FIGS. 2 and 3.

The communication section 14 is arranged suitably, for example on the side face and others opposite to the user side of the keyboard so that it does not hinder the operation of arranged keys. Information received by the communication section 14 is transmitted together with data input via the keys 18 to the body of the computer 5 via a cable 15 and the display 4.

Information may be also transmitted between the keyboard 3 and the display 4 not via the cable 15 but by wireless transmission. Information may be also transmitted between the display 4 and the body of the computer 5 not via the cable but by wireless.

When the communication section 14 constituted as described above detects the non-contact card 2, personal identification information stored in the non-contact card 2 is transmitted to the communication section 14, is supplied to the body of the computer via the cable 15 and the display 4, and the body of the computer authenticates a user. A user table is stored on a storage medium such as a hard disk and memory of the body of the computer. The personal identification information of at least one user accessible to the body of the computer is stored in the user table.

Therefore, the body of the computer authenticates by comparing stored personal identification information and personal identification information received from the non-contact card 2. Personal identification information is transmitted from the keyboard 3 to the body of the computer according to the same format as data input via the keys of the keyboard 3.

If personal identification information transmitted from the non-contact card 2 is authenticated by the body of the computer and the body of the computer judges that the owner of the non-contact card is a real user, login for access to the body of the computer and for access to a network connected to the body of the computer is automatically executed. In the meantime, if as a result of the authentication, the body of the computer judges that the owner of the non-contact card is an invalid user, a message reporting the above is displayed on the display 4 and login for access to the body of the computer and the network is not executed.

When a user starts the operation of a predetermined file or predetermined data, it is determined whether the above user is provided with access authority to the predetermined file or data. That is, if the body of the computer accepts an instruction by a user to start the operation of a new file or new data, a command to transmit the information of an accessible file name or data type stored in the non-contact card 2 is output to the non-contact card 2 via the display 4 and the keyboard 3. In the non-contact card 2, the microcomputer 11 recognizes the command received via the clock regenerating circuit 9 and the demodulator 10, reads the information of the file name or data type stored in FeRAM 13 to which the user can access and outputs the information to the modulator 12. As described above, the information of the file name or data type to which the user can access is modulated and transmitted to the body of the computer via the communication section 14 of the keyboard 3 and the display 4. The body of the computer compares the transmitted information of the file name or data type to which the user can access and the file name or data of which the user instructs to start the operation. If the result of the comparison coincides, the body of the computer allows access to the file or data of which the user instructs to start the operation and if the result of the comparison does not coincide, the body of the computer instructs the display 4 to display a message reporting that the access is disabled.

Communication between the non-contact card 2 and the communication section 14 is executed every predetermined time, for example every 30 seconds, so that if a user temporarily leaves his/her seat at work, communication between the communication section 14 and the non-contact card 2 is disabled. The body of the computer detects the above state in which communication is disabled, stores a file or data at work and inhibits the change of the file or data at work until the user returns to his/her seat and communication between the communication section 14 and the non-contact card 12 is enabled again. Further, the body of the computer executes processing for a power saving mode such as activating a screen saver to prevent the CRT display 4 from seizing, darkening the screen of the display and stopping the rotation of a hard disk. When the user returns to his/her seat and communication between the communication section 14 and the non-contact card 2 is restarted, the body of the computer enables the update of the file or data at work, executes processing for releasing the power saving mode such as the termination of the screen saver and lightening the screen of the display 4 and returns the current state to a state in which operation is enabled.

An area provided to the keyboard 3 in which the communication section 13 can communicate is limited to a fixed range W shown in FIGS. 1 and 3 and in this embodiment in which the communication section 13 is provided to the keyboard 3, the above area is limited to the spherical area W with the keyboard 3 as the center.

The non-contact card 2 suspended from the neck, for example, of a user is automatically located in the vicinity of the keyboard 3 by setting a communicable area as described above if the user sits on a chair 17, for example to use the computer terminal 1 on the table 16 as shown in FIG. 1, that is, in the communicable area W of the communication section 13 provided to the keyboard 3.

Even if a position in which a user works and the body of the computer 5 are separated, the keyboard 3 is normally located close to a user and as a result, located in the communicable area W.

For example, even in a room in which plural computer terminals 1 are arranged, communication between the non-contact card 2 and the computer terminal 1 is enabled in units of user by providing the communication section 14 with the non-contact card 2 to the peripheral equipment connected to the body of the computer 5 and arranged in the vicinity of a user and suitably setting a communicable area W as described above and radio interference between plural non-contact cards 2 and plural computer terminals 1 can be prevented.

If a detected state is bad, the non-contact card 2 has only to approach the keyboard 3 suitably and special adjustments and the like are not required.

In this embodiment, the communication section 14 is provided to the keyboard 3, however, the communication section has only to be provided to the peripheral equipment connected to the body of the computer and arranged in the vicinity of a user and it need scarcely be said that the communication section may be also provided to a mouse, a display, a microphone used for the input of voice, a microphone stand, or an external storage such as a magneto-optical disc.

According to the computer system described above, when a user sits on a chair before which a computer terminal is installed, the user is automatically authenticated and login to the body of the computer and a network is executed.

Further, if a user suspends work and leaves his/her seat, that is, goes out of the detection area W, it is judged that work is suspended and security can be kept by darkening the screen of the display 4, automatically saving a file at work and others. If a message telling that work is continued is displayed on the screen, reported in voice or both, in this state if another user tries to access that person is prevented from interfering during work and security can be kept. It can be also managed when a user starts to work.

The present invention is not limited to the above embodiment and various variations are allowed. For example, in the above embodiment, when a user sits on a chair, a computer automatically authenticates the user and executes login, however, a computer may also require a user to input his/her password only when power is applied in consideration of further security. Also, in the above embodiment, information such as an accessible file name and an accessible data type in a computer system is written to a non-contact card, however, accessible file name and data type may be also stored in the hard disk and others of the body of the computer with them and the identification information of a user in pairs. In this case, if the body of the computer accepts an instruction by a user to start the operation of a new file or new data, the body of the computer compares the personal identification information of a user stored with the personal identification information and accessible file name, data type and others stored in the body of the computer in pairs and the personal identification information received to the non-contact card 2 and if they coincides, the body of the computer allows access to the file or the data.

Further, in the above description of the present invention, the computer is a desktop computer, however, the present invention can be also applied to a portable computer.

As described above, in a computer system according to the present invention, a communication section for communicating with a non-contact card which is excellent in portability is provided to peripheral equipment arranged in the vicinity of a user of a computer terminal, preferably, if a communication section is provided to mobile equipment such as a keyboard and a mouse, the non-contact card 2 suspended from his/her neck and others is automatically located in the vicinity of the keyboard 3 when a user sits on a chair, that is, located in the communicable area W of the communication section 14 provided to the keyboard 3 and a secure detection area can be acquired.

Also, even if a user temporarily leaves his/her seat because communication is periodically made even while the user works, the security of a file and data at work can be kept.

What is claimed is:

1. A computer system constituted by an information processing section and peripheral equipment including at least a display and a keyboard, comprising:

a portable card including a communication circuit for storing personal identification information of a user; and communication means included in said peripheral equipment for communicating with said portable card, wherein said information processing section:

processes said personal identification information received from said portable card via said communication means, activates a screen saver when communication between said portable card and said communication means is interrupted, and terminates the screen saver when communication is restarted between said communication means and said portable card storing the personal identification information of the user for whom login was executed before the communication was interrupted.

2. The computer system according to claim 1, wherein said information processing section stores a user table identifying users for whom login to said computer is allowed; and said information processing section authenticates a user by comparing said personal identification information received from said portable card and said user table.

3. The computer system according to claim 2, wherein said information processing section automatically executes login when it is judged that said personal identification information received from said portable card is included in said user table.

4. The computer system according to claim 2, wherein said information processing section instructs said display to display a message that login is not allowed when it is judged that said personal identification information received from said portable card is not included in said user table.

5. The computer system according to claim 1, wherein said portable card includes means for communicating between said portable card and said communication means every predetermined period.

6. The computer system according to claim 5, wherein said information processing section automatically stores data at work when communication between said portable card and said communication means is interrupted.

7. The computer system according to claim 1, wherein said information processing section automatically stores data at work when communication between said portable card and said communication means is interrupted.

8. The computer system according to claim 5, wherein said information processing section changes the current mode to a power saving mode when communication between said portable card and said communication means is interrupted.

9. The computer system according to claim 5, wherein said information processing section inhibits input of data from said keyboard until communication between said portable card storing the personal identification information of the user for whom login is executed before the communication is interrupted and said communication means is restarted when the communication between said portable card and said communication means is interrupted.

10. The computer system according to claim 5, wherein said information processing section enables input and change of data when communication between said portable card storing the personal identification information of the user for whom login is executed before the communication is interrupted and said communication means is restarted after the communication between said portable card and said communication means is interrupted.

11. The computer system according to claim 5, wherein said information processing section releases a power saving mode if communication between said portable card storing the personal identification information of the user for whom login is executed before the communication is interrupted and said communication means is restarted after the communication between said portable card and said communication means is interrupted.

* * * * *